F. X. MUDD.
POULTRY CAR.
APPLICATION FILED JAN. 24, 1910.
956,401.
Patented Apr. 26, 1910.
2 SHEETS—SHEET 1.
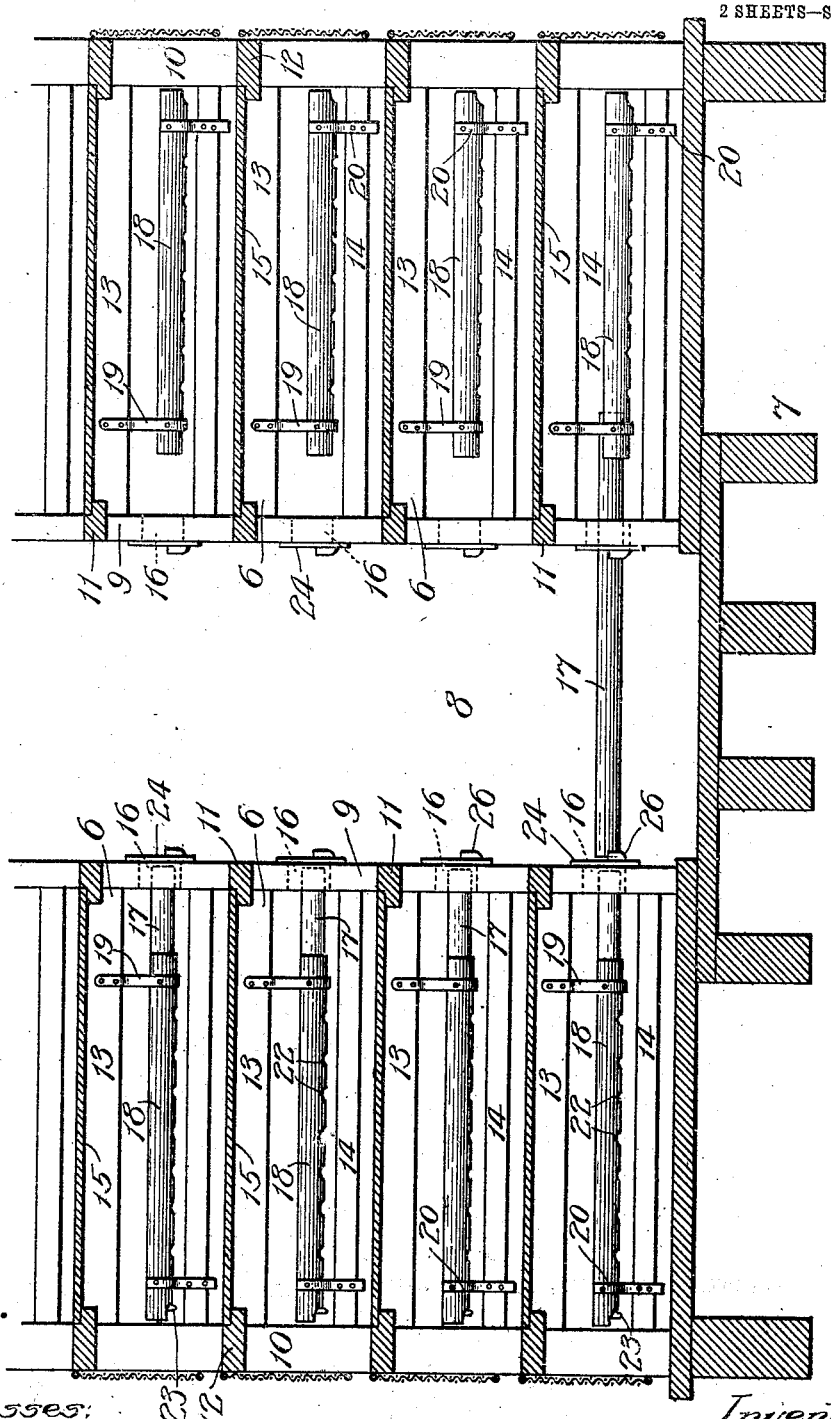

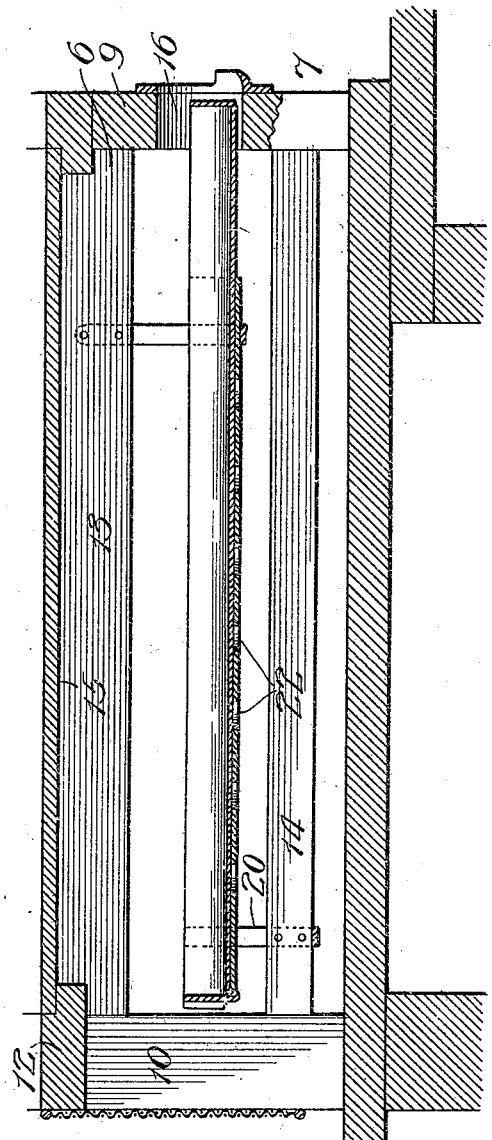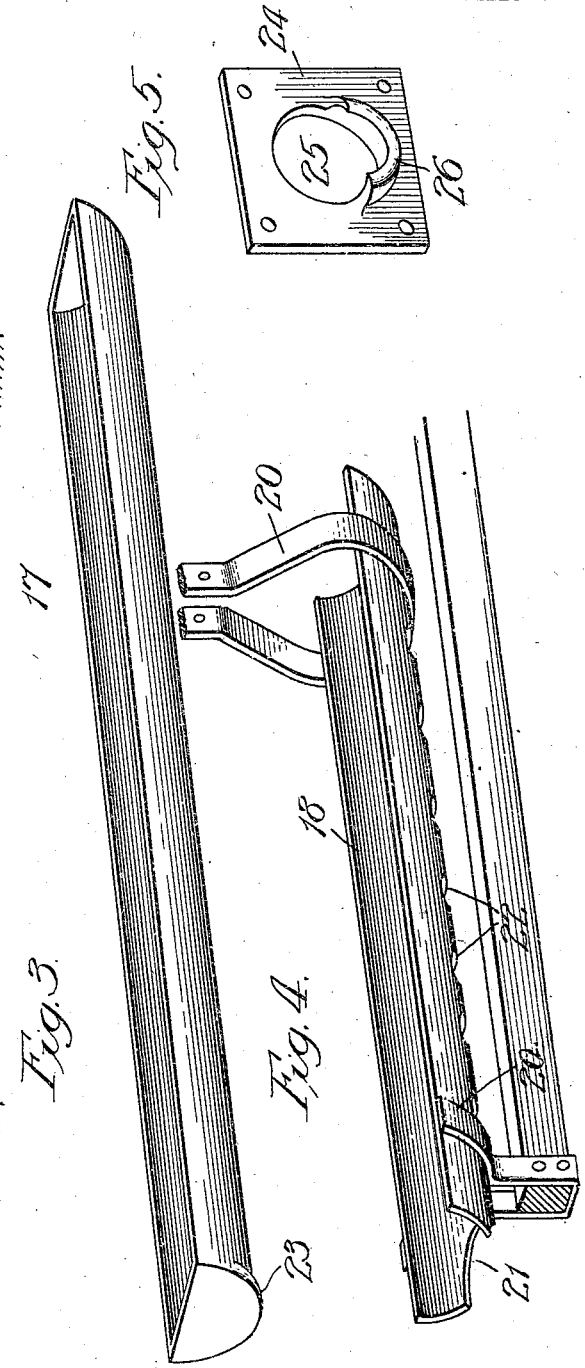

UNITED STATES PATENT OFFICE.

FRANCIS X. MUDD, OF CHICAGO, ILLINOIS, ASSIGNOR TO LIVE POULTRY TRANSPORTATION COMPANY, OF CHICAGO, ILLINOIS, A CORPORATION OF ILLINOIS.

POULTRY-CAR.

956,401.      Specification of Letters Patent.      Patented Apr. 26, 1910.

Application filed January 24, 1910. Serial No. 539,667.

*To all whom it may concern:*

Be it known that I, FRANCIS X. MUDD, a citizen of the United States, residing at 277 Dearborn street, Chicago, in the county of Cook and State of Illinois, have invented a new and useful Improvement in Poultry-Cars, of which the following is a specification.

My invention relates to an improvement in cars of the class employed for shipping live poultry and which, to that end, are provided with longitudinal series of coops in tiers at opposite sides of a central aisle, the coops being equipped with troughs for holding the feed and water for the poultry.

My present improvements, however, relate more particularly to the construction of poultry-car shown and described in Letters Patent of the United States No. 539,229, granted to me on the 14th day of May, 1895. Poultry-cars involving the patented construction referred to have been in extensive daily use under my supervision for many years, whereby certain defects in details have become apparent to me which it is the primary object of my present invention to correct; and while the improvements to that end seem comparatively slight in themselves, they are great in their effect of avoiding injury to the poultry, in adding to their comfort and enhancing their condition of well-being, besides facilitating handling the coop-equipment and tending to save it from injury. Thus, to cite more specifically certain defects in the construction disclosed in the aforesaid patent: The innermost hanger for the shell which supports the trough in each coop is suspended from above. Accumulation of feed and other matter in the shell beneath the trough loosely supported therein raises the latter, bringing it so close to the overhead beam from which the hanger is suspended as to render the trough inaccessible to the poultry, besides emptying water out of it and rendering its withdrawal difficult. This result is now avoided by substituting for the hanger at the inner end of the shell a prop for that end extending upwardly from a beam or support underneath it. Then, to prevent accumulation of feed and waste material in the shell, it is provided with a longitudinal series of openings in its base through which to permit such material to fall out, and an opening or recess is provided in the inner end of the shell for a like purpose as also for the purpose of enabling that end to abut against the post at the outer side of the coop, with the advantage of avoiding the space there formed in the old construction, which permitted chickens to get into it where they were liable to be crushed by the trough in introducing it into place. The recess in the inner end of the shell serves the further purpose of a retainer for securing a shoe or projection provided on the corresponding end of the trough to prevent displacement of the latter under the jolting of the car in motion, a common occurrence in the former construction, resulting in the trough sliding lengthwise into the aisle, dumping its contents there and being liable to damage by breaking. With the old construction it was common to undertake to prevent the occurrence last referred to by hammering out the inner end of the trough in the hole through the post in which it rests, thereby to widen and fasten it in place by friction, but that practice not only impaired the trough but rendered its withdrawal a matter of considerable difficulty. These defects are all overcome and the attendant and other advantages are secured by the devices illustrated in the accompanying drawings, in which—

Figure 1 is a broken view in cross-sectional elevation of a poultry-car equipped with my improvements; Fig. 2 is a similar enlarged view showing only one of the coops; Fig. 3 is a perspective view of a trough; Fig. 4 is a similar view showing a shell with the supporting means therefor at its opposite ends, and Fig. 5 is a similar view of a bearing plate for the outer end of the trough.

The coops 6 in the poultry-car 7, arranged on opposite sides of the aisle 8, and the frame-work of the coop-structure involving the inner and outer posts 9 and 10, longitudinal tie-beams 11 and 12, transverse tie-beams 13, 14 and floors 15, may be the same as the corresponding parts in the aforesaid patent; and, as in said patented construction, the posts 9 contain, near the aisle-doors (not shown) openings 16 through which to introduce and withdraw, at the aisle, troughs 17 by sliding in relatively shorter shells 18. Each shell is supported and fastened at its inner end in a strap-hanger 19 depending from a beam 13, and near its inner end, which should abut, or nearly abut, against a post 10, by a yoke-like prop 20 rising from a beam 14. The inner end of the shell-base is cut away to form a recess 21 therein, and is provided along its base with a longitudinal series of elongated openings 22 through which to permit feed, water, dirt and waste material to discharge and thus avoid accumulation thereof in the shell. The trough 17 is the same as in my aforesaid patent except that it is provided on its inner end with a projection or shoe 23 to enter and engage the shell-recess 21 and thus be held against dislodgment for retaining the trough against longitudinal shifting by the motion of the car, the retention being so yielding, however, as not to present material resistance to disengagement of the heel from the recess in withdrawing the trough into the aisle, as for replenishing it.

At the holes 16 in the posts 9 are fastened to the inner faces of the latter metal plates 24 containing openings 25 registering with the holes, each plate having a curved lip 26 projecting from its face below the opening to afford a rest. When a trough is withdrawn from a coop at one side of the aisle, its advance-end may seat on the lip alining with it on the opposite side of the aisle while its opposite end finds bearing in the post 6 through which it was withdrawn, thereby avoiding any necessity for the attendant's holding the advance-end, as heretofore, since it is thus stably supported at both ends, leaving both hands of the attendant free to be used in replenishing or emptying the trough preparatory to returning it to place and therefore facilitating and expediting the work. As will thus be seen, the recesses in the inner ends of the trough-supporting shells not only serve the purpose of holding the troughs, as described, but they enable the shells to be cleaned in introducing the troughs into them, whereby the troughs shove refuse matter ahead of them in the shells, and permit the large lumps that fail of evacuation through the shell-openings 22 to discharge through the end-recesses 21.

What I claim as new and desire to secure by Letters Patent is:—

1. In a poultry-car containing coops at opposite sides of an aisle, having trough-insertion openings in their frames at the aisle, trough-supporting shells in the coops accessible through said openings, depending hangers for the inner ends of the shells and upwardly extending props for their opposite ends, and troughs insertible into the shells and withdrawable therefrom through said openings.

2. In a poultry-car containing coops at opposite sides of an aisle, having trough-insertion openings in their frames at the aisle, trough-supporting shells in the coops accessible through said openings, and provided with recesses in their outer ends, means securing the shells in position in the coops with their outer ends close to the adjacent sides of the frame-work, said means comprising depending hangers for the inner ends of the shells and upwardly extending props for their opposite ends, and troughs insertible into and withdrawable from the shells through said openings.

3. In a poultry-car containing coops at opposite sides of an aisle, having trough-insertion openings in their frames at the aisle, trough-supporting shells secured in the coops to be accessible through said openings and provided with recesses in their outer ends, and troughs insertible into and withdrawable from the shells through said openings and provided on their outer ends with projections to engage said shell-recesses.

4. In a poultry-car containing coops at opposite sides of an aisle, having trough-insertion openings in their frames at the aisle, trough-supporting shells in the coops accessible through said openings and provided with recesses in their outer ends and with openings in their bases, and troughs insertible into and withdrawable from the shells through said frame-openings.

5. In a poultry-car containing coops at opposite sides of an aisle, having trough-insertion openings in their frames at the aisle, plates on the frames at said openings, having openings registering with the frame-openings and provided with seating-lips for the advance-ends of opposite withdrawn troughs, trough-supporting shells in the coops, and troughs insertible into and withdrawable from the shells through said openings.

6. In a poultry-car containing coops at opposite sides of an aisle, having trough-insertion openings in their frames at the aisle, plates on the frames at said openings, having openings registering with the frame-openings and curved lips projecting from their faces below the plate-openings for supporting the advance-ends of opposite withdrawn troughs, trough-supporting shells in the coops, and troughs insertible into and withdrawable from the shells through said openings.

FRANCIS X. MUDD.

In presence of—
JOHN WILSON,
R. A. SCHAEFER.